C. W. Barrick.
Corn-Planter and Fertilizer-Distributor.
No. 117369 — Patented Jul 25 1871
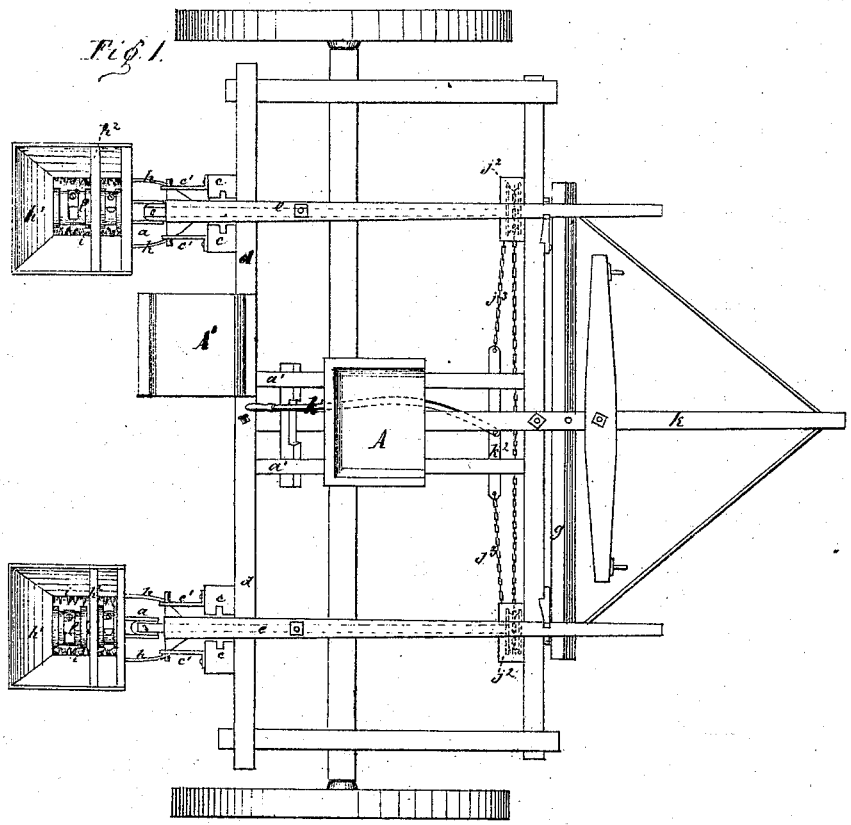
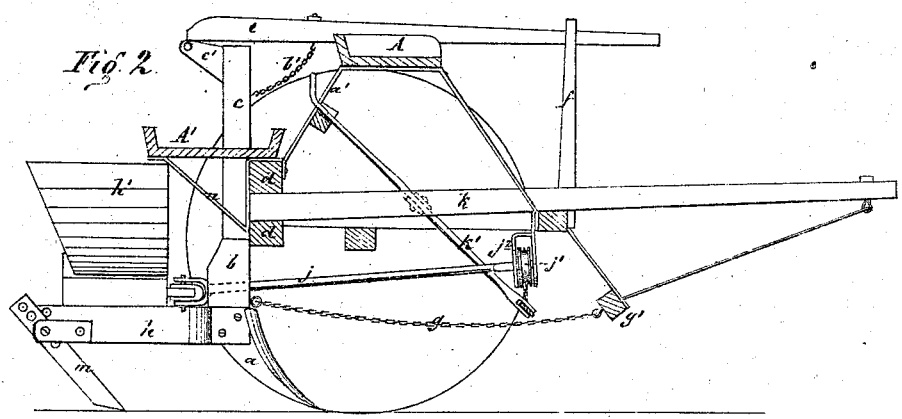
Witnesses:
Inventor:
C. W. Barrick,
per Attorneys.

UNITED STATES PATENT OFFICE.

CHARLES W. BARRICK, OF WALKERSVILLE, MARYLAND.

IMPROVEMENT IN COMBINED CORN-PLANTERS AND FERTILIZER-DISTRIBUTERS.

Specification forming part of Letters Patent No. 117,369, dated July 25, 1871.

*To all whom it may concern:*

Be it known that I, CHARLES W. BARRICK, of Walkersville, in the county of Frederick and State of Maryland, have invented a new and Improved Corn-Planter and Fertilizer-Distributer; and I do hereby declare the following to be a full, clear, and exact description of the same, reference being had to the accompanying drawing making a part of this specification, in which—

Figure 1 is a plan view, and Fig. 2 is a transverse sectional elevation.

This invention relates to an improvement in the method of connecting the dropping mechanism with the main frame of a machine for planting corn and distributing fertilizer, whereby certain advantages are attained in the operation of the same. I will proceed to describe the construction and arrangements of the parts employed for carrying out my invention, in connection with others necessary to form a complete machine.

Referring to the drawing, $a$ are the plows, each of which is attached to a vertical beam, $b$. The beams $b$ slide between vertical grooved guides $c$ $c$ attached to the rear sides of the horizontal bars $d$ $d$, which form the back of the frame of the machine. Lugs $c'$ extend backward from the tops of the guides $c$, between which lugs are jointed the ends of levers $e$, which are otherwise supported in standards $f$ at the front of the frame. The levers $e$ are connected, by chains $b'$, with pins passing transversely through the beams $b$, by means of which chains and levers the plows can be raised when turning or passing over obstacles. Through each beam $b$ a vertical series of holes is made, into either of which the pin that connects with the chain $b'$ may be inserted. The shovels enter the soil until said pins rest on the bars $d$, so that the pins regulate the depth of the furrows. The beams $b$ are perfectly free to rise between the guides should the shovels meet obstacles or the ground be uneven. Pins extending from the sides of the beams $b$ enter the grooves in the guides $c$. Chains $g$ connect the lower ends of the beams $b$ with the extremities of a spreader, $g'$, secured to and beneath the front of the frame. To the beams $b$, at their lower ends, are attached arms $h$, which project backward, two from each beam, which arms support the hopper $h^1$, each of which is divided, by a partition, $h^2$, into two compartments, one for corn and the other for phosphate. A cylinder, $l$, is located at the bottom of each hopper, said cylinder having one set of cups for corn and another for fertilizer, which cups are on opposite sides of the cylinders, so that when one is up the other is down. Brushes $i$ are secured to the sides of the hopper and next to the cylinder $l$, to prevent the escape of grain and fertilizer except by way of the cylinder-cups. With the inner end of each cylinder is connected, by means of a knuckle-joint, the rear extremity of a shaft, $j$. The shafts $j$ pass through the beams $b$, and their front ends enter sheaves $j^1$, which have beveled orifices, so as to allow the shafts $j$ to be set at any angle of elevation. The sheaves $j^1$ are hung in boxes $j^2$ attached to the front beam of the frame. A chain, $j^3$, passes around both sheaves, which chain is operated by means of a lever, $k^1$, whose fulcrum is in one side of the tongue $k$, and whose lower end is jointed to a plate, $k^2$, that forms a part of the chain $j^3$. The upper end of the lever $k^1$ is in rear of the driver's seat A and in front of the dropper's seat A', said lever extending between the two rear braces $a'$ $a'$ of the driver's seat, which braces serve to limit the throw of the lever. A movement by the dropper of the lever $k'$ from one brace $a'$ to the other turns the cylinder $l$ half-way round, bringing the upper cups to the under side so as to cause them to empty the seed and fertilizer which they contain upon the ground. A counter movement of the lever from brace to brace restores the cylinders $l$ to their original positions, with the cups uppermost, so that they can be again filled. To checker the field the furrows are run parallel, and are crossed at right angles in planting. The lever $k^1$ is moved forward on reaching one row, and back at the next, so that each half-revolution will make a drop. The beams $b$ and guides $c$ are attached to the bars $d$ by means of screws passing through slots in the bars, and also through the guides $c$, by which arrangement the beams $b$ are made capable of shifting so as to increase or diminish the distance between the furrows. Blades $m$ are fastened to the rear ends of the arm $h$, said blades being inclined outward, and extending downward below the arms $h$ far enough to operate as coverers to the corn. The blades $m$ can be raised or lowered by means of holes $m'$ made in a series in each of them, through either of which holes passes the pin that secures the blade to the arm. The dropper's seat A' is furnished with hooks *n*, Fig. 2, which, when placed over the beam *d*, fasten the seat thereto. This is an adjustable means of attachment, enabling the seat to be shifted along the bar *d* as occasion may call.

Having thus described my invention, what I claim as new, and desire to secure by Letters Patent, is—

The adjustable frame *h*, in combination with the longitudinal semi-rotary cylinder *l*, operated by shaft *j* having universal joint, whereby the dropping mechanism is not affected by the adjustment of the frame, substantially as set forth.

CHARLES W. BARRICK.

Witnesses:
  I. E. WALKER,
  GEO. W. STAUFFER.